United States Patent [19]
Stern

[11] 3,885,417
[45] May 27, 1975

[54] FLUIDIC GAUGING SENSOR HEAD HAVING A GAS BEARING MATERIAL

[75] Inventor: Hansjoerg Stern, Schenectady, N.Y.
[73] Assignee: General Electric Company, New York, N.Y.
[22] Filed: June 28, 1973
[21] Appl. No.: 374,319

[52] U.S. Cl. .............. 73/37.7; 33/DIG. 2; 73/160; 308/DIG. 1
[51] Int. Cl. ............................................ G01b 13/08
[58] Field of Search ......... 73/37.7, 37.8, 37.6, 37.5, 73/160; 308/DIG. 1; 33/147 L, DIG. 2

[56] References Cited
UNITED STATES PATENTS

| | | | |
|---|---|---|---|
| 2,860,507 | 11/1958 | Geiser et al. | 73/37.7 |
| 3,199,339 | 8/1965 | Lipski | 73/37.7 |
| 3,245,334 | 4/1966 | Long | 308/DIG. 1 UX |
| 3,282,085 | 11/1966 | Benson et al. | 73/37.7 |
| 3,667,282 | 6/1972 | Czwakiel et al. | 73/37.7 |

FOREIGN PATENTS OR APPLICATIONS 1,920,680  4/1969  Germany .......................... 73/37.7

OTHER PUBLICATIONS
Cadwallader, R. H. et al., Wire Gage & Straightener, In IBM Tech. Disc. Bulletin, 9(9): p. 1,121, February, 1967.

*Primary Examiner*—Richard C. Queisser
*Assistant Examiner*—Joseph W. Roskos
*Attorney, Agent, or Firm*—S. A. Young; W. C. Bernkopf

[57] ABSTRACT

A fluidic gauging sensor head for monitoring a characteristic of strand-like material and for guiding and centering the material as it passes therethrough. In one embodiment of the invention the sensor head is comprised of a block having two guide sections and a sensing section intermediate the respective guide sections. Each of the guide sections includes a uniformly porous air bearing having a bore extending the length thereof, a gas manifold surrounding the bearing and extending almost the full length of the bearing, and a gas supply passage extending between the manifold and an outer periphery of said support block for pneumatically conducting a pressurized gas to the manifold. The gas uniformly permeates each gas bearing and forms uniform pressure gradients within each bore which causes the strand-like material passing through each respective bore to be axially centered therein. The intermediate sensor section includes a channel aligned with the bores of the gas bearings so as to receive the strand-like material passing through the gas bearings. Gas is supplied to the channel via a passageway which extends between the channel and the outer periphery of the support block. In another embodiment of the invention a support block having a single gas bearing extends the length of the block wherein the gas bearing is surrounded by a gas manifold and the strand-like material passes through a bore in the bearing. In this instance the gas bearing serves the combined purpose of a guide for centering the strand-like material within the bore and a fluidic sensor head for monitoring a characteristic of the strand-like material in accordance with linear changes in back pressure of gas passing through a passageway from the outer periphery of the block to the gas manifold.

14 Claims, 9 Drawing Figures

PATENTED MAY 27 1975        3,885,417

SHEET 1

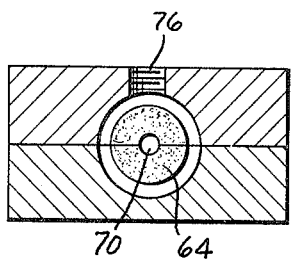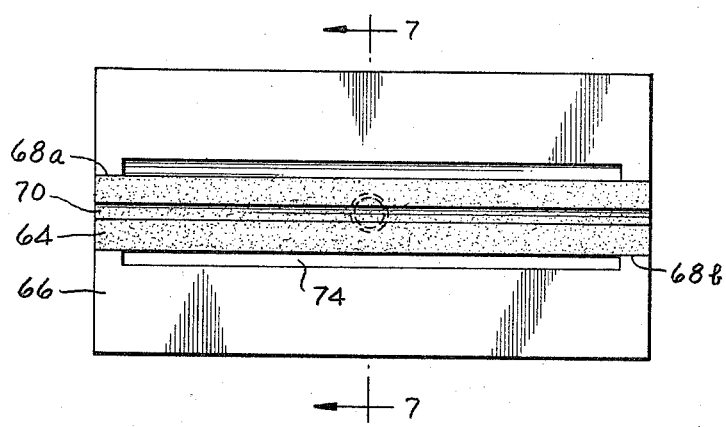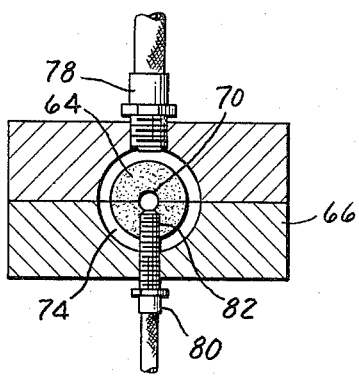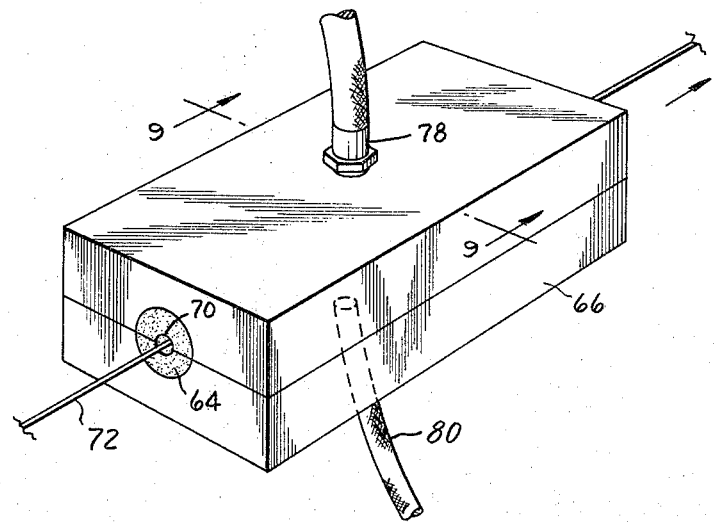

FLUIDIC GAUGING SENSOR HEAD HAVING A GAS BEARING MATERIAL

BACKGROUND OF THE INVENTION

1. Field of the Invention

This invention relates to a fluidic gauging sensor head for monitoring a characteristic of a continuously moving strand-like material which is passing therethrough, and more particularly, to a fluidic gauging sensor head which includes means for guiding the material as it moves through the head.

2. Description of the Prior Art

When using fluidic gauging apparatus of the type disclosed in U.S. Pat. No. 3,667,282, to Czwakiel and Miller, entitled "Fluidic Gauging Sensor Head" issued June 6, 1972, for continuously monitoring a characteristic of material such as yarn or wire, the accuracy and repeatability of the monitored characteristic of the material can be limited by unwanted output variations caused by shifts in the location of the material in a sensing channel of the (sensor head) apparatus. Such variations are further caused by a lack of concentricity of the material within the channel and/or changes in the angle of incidence of the material as it passes through the channel, all of which may be due to variations in tension on and vibration of the material.

In order to stabilize the position of the continuously moving material as it passes through the channel of the sensor head, the use of mechanical guides has been suggested. However mechanical guides are relatively difficult to install within reasonable tolerances unless ultra-precision assembly techniques are used. This is particularly true when the diameter of the material is approximately 0.004 inches and the diameter of the channel is approximately 0.005 inches. Furthermore even after such a mechanical guide is installed, it will be subject to wear, and for the material and channel diameters mentioned above, a guide wear or even an installation error of 0.00025 inches would cause an introduction of a 50% eccentricity in the position of the material with respect to the longitudinal axis of the channel as the material passes therethrough. Thus even a sophisticated mechanical guide may not improve the immediate or long term accuracy and repeatability of on line measurements obtained from the above described standard fluidic gauging sensor heads.

OBJECTS OF THE INVENTION

It is therefore an object of this invention to provide an improved fluidic gauging sensor head which is more accurate and reliable in monitoring a characteristic of material which is continuously passing therethrough.

It is another object of this invention to provide an improved fluidic gauging sensor head which is capable of stabilizing the positioning of the continuously moving material which is passing therethrough so as to avoid the introduction of inaccuracies that normally result from the instability in positioning of the material within the channel of the sensor head.

It is another object of this invention to provide an improved fluidic gauging sensor head which has wear resistant means for guiding the continuously moving material through the channel of the sensor head.

Other objects of the invention will be pointed out hereinafter.

SUMMARY OF THE INVENTION

In accordance with the broad aspect of the invention there is provided a fluidic gauging sensor head for monitoring a characteristic of a continuously moving strand-like material and for guiding the movement of the material as it passes through a channel in the sensor head.

According to one embodiment of the invention the sensor head is comprised of a support block having first and second guide sections and a fluidic sensor section interposed between and pneumatically isolated from each of the guide sections. Each guide section includes a uniformly porous gas bearing, which extends the length thereof, and a longitudinally extending bore within the bearing. A gas manifold surrounds each gas bearing for almost its full length thereof. The sensor section has a channel which is concentrically aligned with the respective bores in the gas bearings for receiving the strand-like material. The channel is fluidically connected via a passage to a source of supply and monitoring means for detecting variations in back pressure from the channel, which variations are proportional to changes in the characteristic of the material. A pressurized gas is supplied to the gas bearings through respective passageways which extend between the outer periphery of the support block and the respective gas manifolds. The gas uniformly permeates through the outer walls of each of the bearings and flows into the respective bores so as to concentrically align the material passing through the channel in the sensor section, and thereby eliminate unwanted inaccuracies which otherwise would have resulted from the eccentricity in the positioning of the strand-like material as it passed through the channel in the sensor section.

In accordance with another embodiment of the invention the sensing and guide functions are combined into one section wherein the whole fluidic gauging sensor head is comprised of a single gas bearing which extends the length of the sensor head's support block. The bearing has a bore which also extends the full length thereof. A gas manifold surrounds the bearing within the support block and is pneumatically connected to a pressurized gas supply via a passageway that extends between the manifold and the outer periphery of the support block. The pressurized gas which is fed into the manifold again permeates through the uniformly porous gas bearing so as to form a uniformly distributed pressure gradient on the passing material to cause the material to be concentrically centered within the bore. Furthermore, since the back pressure of the gas from the gas manifold is linearly proportional to the axial clearance between the strand-like material and the walls of the bore, the characteristic of the strand-like material can also be sensed by this same structure which is guiding and maintaining the concentricity of the material passing through the bore.

BRIEF DESCRIPTION OF THE DRAWINGS

FIG. 6 is a top view of the bottom half of the fluidic gauging sensor head shown in FIG. 5;

FIG. 7 is a side sectional view of the fluidic gauging sensor head shown in FIG. 5 taken along lines 7—7;

FIG. 8 is a perspective view of a modified form of the second embodiment of the fluidic gauging sensor head shown in FIG. 5; and FIG. 9 is a side sectional view of the fluidic gauging sensor head shown in FIG. 8 taken along lines 9—9.

DESCRIPTION OF THE PREFERRED EMBODIMENTS

A first embodiment of the invention will now be explained with reference to FIGS. 1 through 4.

Figure 1:
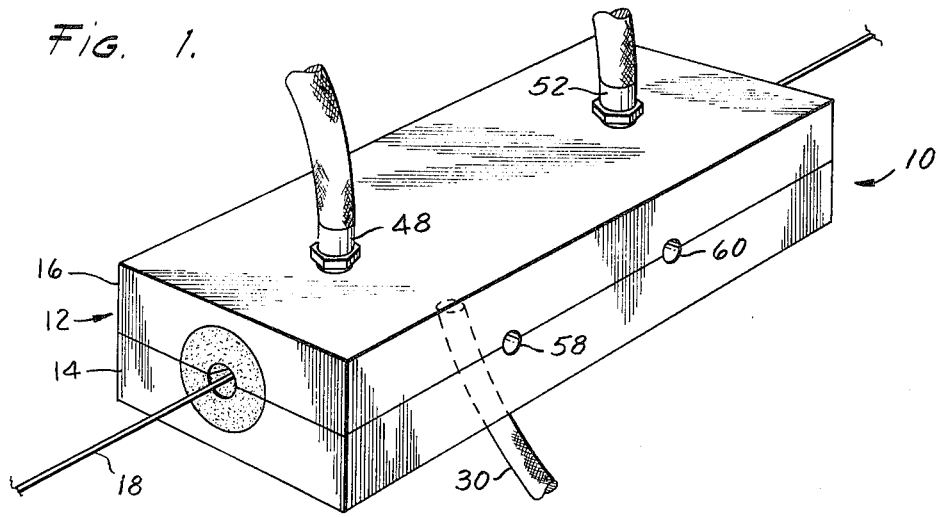
FIG. 1 is a perspective view of one embodiment of the invention.

As shown in FIG. 1 a fluidic gauging sensor head 10 is comprised of a support block 12 having a lower half portion 14 and a mating upper half portion 16 wherein a length of continuously moving material 18, which has a characteristic thereof being monitored, passes through the fluidic gauging sensor head. Material 18 may be in the form of a monofilament or multifilament strand of yarn, wire or tubing, etc. The characteristic of material 18 being monitored may be its diameter, denier, sliver weight, density, porosity, etc. The support block itself can be comprised of any suitable structural material such as anodized aluminum, stainless steel, etc.

Figure 2:
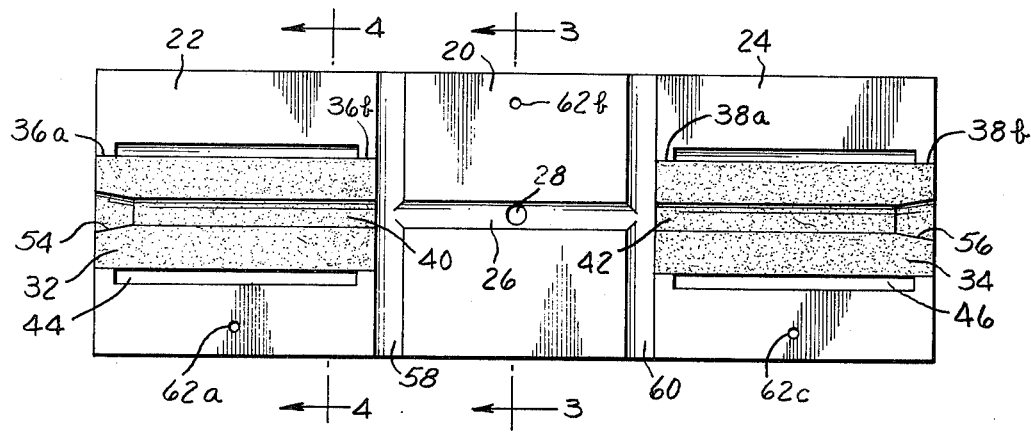
FIG. 2 is a top view of the bottom half section of the fluidic gauging sensor head shown in FIG. 1.
Figure 3:
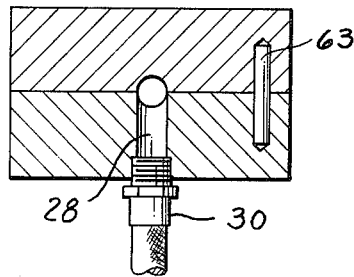
FIG. 3 is a side sectional view of the sensor section of the fluidic gauging sensor head shown in FIG. 1 taken between lines 3—3.
Figure 4:
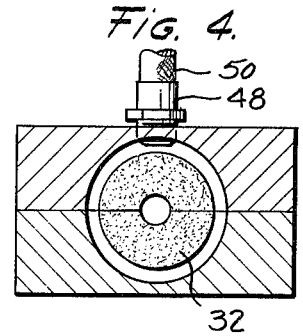
FIG. 4 is a side sectional view of the guide section of the fluidic gauging sensor head shown in FIG. 1 taken along lines 4—4.

Referring to lower half portion 14 of block 12 as shown in FIG. 2, a sensor section 20 is disposed between respective first and second guide sections 22 and 24 wherein half of each section is formed within each respective half portion of the support block. Sensor section 20 is comprised of a channel 26 which extends the full length of section 20 such that one half of the channel is formed within the top half and the other half of the channel is formed within the bottom half of the support block. A source of pressurized gas and back pressure monitoring means (not shown) are fluidically coupled to channel 26 via a fluidic passageway 28, which passageway extends from the mid length point of that portion of the channel in the bottom half of support block 12 to the periphery of the block, and a fluidic duct or carrier 30 which has one end thereof fastened within a tapped section of passageway 28 adjacent the periphery of the bottom half of support block 12.

Guide sections 22 and 24 include respective cylindrically shaped gas bearings 32 and 34 which extend the full length of each respective section. The gas bearings can be comprised of any suitable uniformly porous material such as sintered bronze or sintered stainless steel and can be manufactured using the techniques described in our copending U.S. patent application Ser. No. 258,034, to Thomas Conroy and Carl Ringwall, filed May 30, 1972 for "Fabrication Process For Porous Metal Bearings" and assigned to the assignee of the present invention, or any other technique which may be found to be suitable. Bearings 32 and 34 actually consist of symetrically formed mating upper and lower halves, wherein each respective half is press fitted into the respective upper and lower halves of support block 12. For example, as shown in FIG. 2, the respective ends of the lower half of bearing 32 are force fitted into mating end portions 36a and 36b of the lower half portion of support block 12, while the respective ends of the lower half of bearing 34 are also force fitted into mating end portions 38a and 38b in the lower half portion of support block 12. Likewise the upper half of respective bearings 32 and 34 are similarly force fitted into the upper half of the support block. When the mating halves of the gas bearings are pressed together, a centrally located bore 42 extends through the axial length of bearing 34. A high pressure gas manifold 44 surrounds bearing 32 within the upper and lower halves of the supporting block and extends between end portions 36a and 36b of guide section 22. Similarly a gas manifold 46 surrounds gas bearing 34 within the upper and lower halves of the support block and extends between end portions 38a and 38b of guide section 24. Pressurized gas (air) is supplied to manifold 44 in guide section 22 via a passageway 48, which passageway extends between the outer periphery of the top surface of the upper half of support block 12 and gas manifold 44, and a fluidic conduit 50 which has one end pneumatically connected to passageway 48. Similarly pressurized gas is supplied to gas manifold 46 via a passageway (not shown), which extends between the top surface of the upper half of block 12 and manifold 46, and a fluidic conduit 52 which has one end thereof fluidically connected to that passageway. Channel 26 is aligned concentrically with bores 40 and 42 so that material 18 can pass through the channel and the respective bores. Ends 54 and 56 of respective bores 40 and 42, which are respectively adjacent the outer opposite sides of the support block, are conically flared outward so as to facilitate the initial guiding of strand-like material into either one of the bores. Means for pneumatically isolating channel 26 in sensor section 20 from bore 40 in guide section 22 and bore 42 in guide section 24 is provided by respective holes 58 and 60 which extend through the support block in a direction perpendicular to the axis of channel 26. Hole 58 is positioned between guide section 22 and sensor section 20, and is formed within the mating surfaces of the upper and lower halves of the support block. Similarly hole 60 is positioned between sensor section 20 and guide section 24, and again is formed within the mating surfaces of the upper and lower halves of the support block. The diameter of channel 26 is preferably about the same size as the diameter of bores 40 and 42 or possibly slightly smaller, and the length of channel 26 is at least approximately ten times larger than the diameter of channel 26 for satisfactory monitoring operation. The lower half of support block 12 can have holes 62a, 62b and 62c formed therein for receiving the lower portions of locating dowels 63. The upper half of the support block can have similar locating holes for receiving the upper portions of the dowels which extend beyond the upper surface of the lower half of the block so as to facilitate proper alignment and assembly of the upper and lower halves of the support block.

The operation of the fluidic gauging sensor head shown in FIGS. 1–4 will now be explained. The upper and lower halves of the support block are temporarily separated so that the continuously moving material can be positioned therewithin. The halves of the support block are closed together so that the material can move through bore 40, channel 26 and bore 42. Since support block 12 is symmetrically designed, the material can move in either direction without affecting the operation of the sensor head. Pressurized gas is fed to the respective manifolds of sections 22 and 24. The gas uniformly permeates respective bearings 32 and 34 so as to form uniform pressure gradients on the strand-like material within the bores whereby the material is centered along the axial length of the bores. The centering of the material along the axial length of bores 40 and 42 causes the material to be similarly centered along the axial length of channel 26 as the material passes therethrough, which eliminates errors that would otherwise be caused by the axial eccentricity and dynamic movement of the material in a direction non parallel to the axial length of the channel if guide sections 22 and 24 were not present. Hole 58 provides pneumatic isolation between guide section 22 and sensor section 20 by insuring that gas flowing out of bore 40 in the axial direction and toward channel 26 will escape to the atmosphere through hole 58 so as not to affect the gas flow within channel 26, while gas flowing out of channel 26 toward bore 40 will also escape through hole 58 to the atmosphere so as not to affect the gas flow within bore 40. Hole 60 similarly provides pneumatic isolation between guide section 24 and sensor section 20 by insuring that gas flowing out of bore 42 in the axial direction toward channel 26 escapes to the atmosphere through hole 60 without affecting the gas flow within bore 42, while gas flowing out of channel 26 toward bore 42 will also escape through hole 60 to the atmosphere so as not to affect the gas flow within bore 42. The monitoring of the characteristic of the strand-like material as it moves through channel 26 is a result of changes in the back pressure of the fluid sensed from passageway 48, which changes are linearly proportional to the lamina gas flow in the axial direction through channel 26 between the continuously moving material and the walls of the channel.

Figure 5:
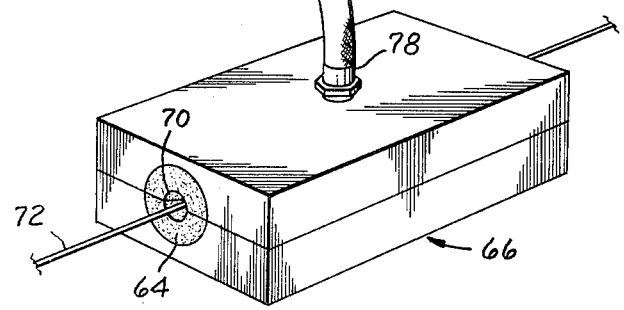
FIG. 5 is a perspective view of a second embodiment of the fluidic gauging sensor head.

In the embodiment shown in FIGS. 5 to 7, the sensing and guiding functions are combined within one structure which is similar to either section 22 or 24 of the previous embodiment. A uniformly porous gas bearing 64 extends the full length of a support block 66. Bearing 64 and block 66 are again made of the same material as their analogous parts in the first embodiment, and both again have upper and lower halves. FIG. 6 shows the opposite ends of the lower half of bearing 64 press fitted within end groove sections 68a and 68b of the bottom half of support block 66. The upper half of bearing 64 is similarly press fitted within similar end groove sections of the upper half of the support block (not shown). When the upper and lower halves of the support block are placed in mating engagement, a bore 70 is defined centrally within bearing 64 and extends the full axial length thereof for receiving and enabling passage therethrough of a strand-like material 72 to be monitored. A gas manifold 74 surrounds bearing 64 and extends between end groove section 68a and 68 b. A source of pressurized gas and means for monitoring variations in back pressure caused by the gas flow through bore 70 are pneumatically coupled to manifold 74 via a passageway 76, which passageway is centrally located between opposite ends of bore 70 and extends between manifold 74 and the outer periphery of the top surface of the upper half of support block 66, and a pneumatic tubing or carrier 78 having one end pneumatically connected to passageway 76. The axial length of bore 70 is at least about ten times greater than its diameter in order to insure satisfactory monitoring operation.

In operation high pressure gas is supplied to manifold 74 and permeates uniformly porous gas bearing 64 to provide radial pressure gradients on the continuously moving strand-like material within bore 70 so as to center the material axially within the bore to again eliminate the previously described inaccuracies. Since the gas flow through bore 70 is extremely sensitive to the clearance between the material and the walls of the bore, the resulting sensed back pressure of the gas in passageway 76 will be linearly proportional to a characteristic of strand-like material 72 so that the material's characteristic can be monitored. Thus, the particular structure shown in FIGS. 5 to 7 can simultaneously operate as a compact fluidic gauging sensor head and a pneumatic guide for eliminating inaccuracies in sensed parameters that otherwise would have resulted from any eccentricity in the position of the material passing through the bore if the gas bearing structure were not used.

In FIGS. 8 and 9 a modification of the embodiment shown in FIGS. 5 to 7 is depict. In accordance with this modification in addition to the source of gas supplied to manifold 74, a separate source of pressurized gas and back pressure monitoring means are fluidically coupled to bore 70 via a fluidic carrier 80 and passageway 82. Passageway 82 extends from bore 70 through the lower half of bearing 64 and support block 66, while carrier 80 extends from the outer periphery of the support block into passageway 82 and has one thereof fastened within a tapped section of passageway 82 within the lower half of the bearing. Thus by fluidically connecting the monitoring means and a separate source of gas directly to the bore a greater sensitivity of the monitored characteristics may be obtained than is the case when the monitoring means is fluidically connected to the manifold.

Although the invention has been described with reference to certain specific embodiments thereof, it will be understood from the foregoing that numerous modifications are possible without departing from the invention, and it is desirable to cover all modifications falling within the spirit and scope of this invention.

What I claim as new and desire to secure by Letters Patent of the United States is:

1. A fluidic gauging sensor head for monitoring a characteristic of strand-like material and guiding the material therethrough, comprising:
   a. a support block having first and second guide sections and a fluidic sensor section positioned intermediate said first and second guide sections;
   b. means for pneumatically isolating said intermediate sensor section from said respective first and second guide sections;
   c. each guide section including a uniformly porous gas bearing extending the axial length thereof, a manifold surrounding said gas bearing and extending lengthwise between points adjacent opposite ends of said gas bearing, a supply port extending between said manifold and the periphery of said block;
   d. each of said gas bearings having a bore extending the complete length therethrough; and
   e. said intermediate sensor section including a channel extending lengthwise therethrough and concentrically aligned with each said bore in each of said gas bearings respectively, and means for admitting pressurized fluid to said channel to sense variations in the back pressure therefrom proportional to changes in the characteristic of the material being monitored as the strand-like material passes through said bore in said first guide section, into and through said channel in said sensor section and out through said bore and said second section whereby pressurized gas can be supplied to each of said manifolds for permeating uniformly through each said gas bearing into each of said bores so as to center the strand-like material passing through said bores thereby causing the strand-like material to be centered within said channel in said sensor section while passing therethrough.

2. A fluidic gauging sensor head according to claim 1 wherein said pneumatic isolating means has a first hole located in said block between one end of said channel and one end of said bore in said first guide section and extending to the periphery of said block, and a second hole located in said block between the other end of said channel and one end of said bore in said second guide section and extending to the periphery of said block.

3. A fluidic gauging sensor head according to claim 2 wherein the other ends of each of said bores extend to the periphery of said block and are larger in dimension with respect to the remaining portions of each of said bores so as to provide initial guidance for the strand-like material upon entering and leaving said bores.

4. A fluidic gauging sensor head according to claim 1 wherein said block is comprised of cooperating upper and lower portions.

5. A fluidic gauging sensor head according to claim 4 wherein each portion of said block contains half of each of said gas bearings, half of each of said manifolds and defines half of said channel.

6. A fluidic gauging sensor head for monitoring a characteristic of strand-like material and for guiding the material therethrough, comprising:
 a. a support block;
 b. a uniformly porous gas bearing having a bore extending through the full length thereof, said bearing being mounted within said support block and extending the full length of said block;
 c. a gas manifold within said block completely surrounding said gas bearing in a plane perpendicular to the length of said bore and extending between portions adjacent opposite ends of said bearing; and
 d. a gas supply passageway extending between said manifold and the outer periphery of said block whereby pressurized gas can be supplied through said passageway to said manifold for permeating radially inward and uniformly through said bearing to said bore, thereby causing the strand-like material passing through said bore to be centered therewithin and guided therethrough while the characteristic of the strand-like material is monitored by sensing variations in the back pressure of the gas exiting said gas supply passageway.

7. A fluidic gauging sensor head according to claim 6 wherein said support block is comprised of cooperating upper and lower portions.

8. A fluidic gauging sensor head according to claim 7 wherein each half portion includes half of said gas bearing and half of said manifold.

9. A fluidic gauging sensor head for monitoring a characteristic of strand-like material and for guiding the material therethrough, comprising:
 a. a support block;
 b. a uniformly porous gas bearing having a bore extending through the full length thereof, said bearing being mounted within said support block and extending the full length of said block;
 c. a gas manifold within said block completely surrounding said gas bearing in a plane perpendicular to the length of said bore and extending between portions adjacent opposite ends of said bearing;
 d. means for supplying pressurized fluid to said bore to sense variations in the back pressure therefrom proportional to changes in the characteristic of the material being monitored as the material passes through said bore; and
 e. a first passageway extending between said manifold and the outer periphery of said block whereby pressurized gas is supplied through said first passageway to said manifold and permeates radially inward and uniformly through said bearing to said bore, thereby causing the strand-like material passing through said bore to be centered therewithin and guided therethrough.

10. A fluidic gauging sensor head according to claim 9 wherein said support block is comprised of an upper and a lower half portion.

11. A fluidic gauging sensor head according to claim 10 wherein each half section includes half of said gas bearing and half of said manifold.

12. A fluidic gauging sensorhead according to claim 11 wherein said supplying means includes:
 a. a second passageway extending within the lower half of said bearing from said bore to said manifold and continuing within the lower half of said support block between said manifold and the outer periphery of said support block; and
 b. a fluidic conduit extending from the outer periphery of said support block into said second passageway and having one end thereof terminating at that section of said second passageway within said bearing.

13. A fluidic gauging sensor head for monitoring a characteristic of strand-like material and guiding the material therethrough, comprising:
 a. a support block;
 b. a fluidic sensor section within said block for monitoring the characteristic of the material passing therethrough;
 c. means for guiding the material through said sensor section including a uniformly porous gas bearing, a manifold completely surrounding said gas bearing in a plane perpendicular to the movement of the strand-like material and a supply port extending between said manifold and the periphery of said block; and
 d. said gas bearing having a bore extending the complete length therethrough whereby pressurized gas can be supplied to said manifold for permeating radially inward and uniformly through said gas bearing into said bore so as to center and guide the strand-like material passing through said bore.

14. A wear resistant fluidic device for guiding strand-like material to be monitored, comprising:
  a. a support block;
  b. a uniformly porous gas bearing positioned within said block and having a bore extending the complete length thereof; and
  c. said block having a manifold completely surrounding said gas bearing in a plane perpendicular to the length of said bore and a supply port extending between said manifold and the periphery of said block, whereby pressurized gas can be supplied to said manifold for permeating radially inward and uniformly through said gas bearing so as to center and guide the strand-like material passing through said bore.

* * * * *